(12) United States Patent
Kaminski et al.

(10) Patent No.: US 6,977,459 B1
(45) Date of Patent: Dec. 20, 2005

(54) APPARATUS AND METHODS FOR ANCHORING A MODULAR WINDING TO A ROTOR IN AN ELECTRICAL MACHINE

(75) Inventors: Christopher Anthony Kaminski, Schenectady, NY (US); Robert John Nygard, Saratoga Springs, NY (US); James Pellegrino Alexander, Ballston Lake, NY (US); Yu Wang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/853,197

(22) Filed: May 26, 2004

(51) Int. Cl.$^7$ ................................................ H02K 1/28
(52) U.S. Cl. ......................... 310/261; 310/262; 29/598
(58) Field of Search ............................. 310/261, 262; 29/598

(56) References Cited

U.S. PATENT DOCUMENTS

| | | | |
|---|---|---|---|
| 4,013,908 A * | 3/1977 | Weghaupt .................... | 310/61 |
| 4,117,360 A | 9/1978 | Richter | |
| 4,151,639 A * | 5/1979 | Weghaupt .................... | 29/598 |
| 4,267,474 A * | 5/1981 | Kullmann .................... | 310/52 |
| 4,282,450 A * | 8/1981 | Eckels ......................... | 310/52 |
| 4,303,842 A * | 12/1981 | Nathenson ................... | 310/64 |
| 4,342,932 A * | 8/1982 | Glebov et al. ................ | 310/52 |
| 4,363,982 A | 12/1982 | Kaminski | |
| 4,543,503 A | 9/1985 | Kaminski et al. | |
| 4,667,125 A | 5/1987 | Kaminski et al. | |
| 4,709,177 A | 11/1987 | Kaminski | |
| 4,739,207 A * | 4/1988 | Ying et al. ................... | 310/214 |
| 4,814,655 A | 3/1989 | Kaminski | |
| 4,908,537 A * | 3/1990 | Sismour, Jr. ................. | 310/51 |
| 5,065,064 A | 11/1991 | Kaminski | |
| 5,281,877 A | 1/1994 | Kazmierczak et al. | |
| 5,358,432 A | 10/1994 | Shih et al. | |
| 5,459,363 A * | 10/1995 | Miyakawa et al. ......... | 310/214 |
| 5,886,434 A | 3/1999 | Nygard | |
| 5,929,550 A | 7/1999 | Kaminski et al. | |
| 5,986,380 A | 11/1999 | Kaminski et al. | |
| 6,081,178 A | 6/2000 | Wang et al. | |
| 6,169,353 B1 * | 1/2001 | Driscoll et al. ............. | 310/261 |
| 6,181,228 B1 | 1/2001 | Laskaris et al. | |
| 6,194,807 B1 | 2/2001 | Kaminski et al. | |
| 6,198,371 B1 | 3/2001 | Laskaris et al. | |
| 6,201,462 B1 | 3/2001 | Laskaris et al. | |
| 6,239,527 B1 | 5/2001 | Kaminski et al. | |
| 6,246,308 B1 | 6/2001 | Laskaris et al. | |
| 6,291,919 B1 | 9/2001 | Ganti et al. | |

(Continued)

FOREIGN PATENT DOCUMENTS

GB      2045542 A    * 10/1980      ............ H02K 3/50

(Continued)

Primary Examiner—Joseph Waks
(74) Attorney, Agent, or Firm—Nixon & Vanderhye P.C.

(57) ABSTRACT

Locking strips secure winding modules to a rotor. The locking strips have paired deep and shallow recesses along a long edge and are disposed in a groove along the rotor. Upon assembly of the winding module, the deep recesses of the locking strips are aligned, enabling the winding supports of the winding module to engage in the deep recesses. The strips are then axially displaced in opposite directions relative to one another to engage portions of the strips within grooves of the winding supports and edges of the shallow recesses to straddle the winding supports. Pins are received in aligned holes of the locking strips in the locked configuration. Consequently, the modular winding is retained against axial and peripheral movement and outward displacement along a parallel face of the rotor shaft.

14 Claims, 7 Drawing Sheets

U.S. PATENT DOCUMENTS

| | | |
|---|---|---|
| 6,313,561 B1 | 11/2001 | Nygard et al. |
| 6,339,268 B1 | 1/2002 | Kaminski et al. |
| 6,346,753 B1 | 2/2002 | Jarczynski et al. |
| 6,369,482 B1 | 4/2002 | Rink, Jr. et al. |
| 6,415,613 B1 | 7/2002 | Ackermann et al. |
| 6,437,476 B1 | 8/2002 | Nygard et al. |
| 6,438,969 B1 | 8/2002 | Laskaris et al. |
| 6,442,949 B1 | 9/2002 | Laskaris et al. |
| 6,448,686 B1 | 9/2002 | Dawson et al. |
| 6,495,942 B1 | 12/2002 | Kaminski et al. |
| 6,703,733 B1 * | 3/2004 | Wang et al. .................. 310/85 |

FOREIGN PATENT DOCUMENTS

| | | | |
|---|---|---|---|
| JP | 04372103 A * | 12/1992 | ............. H01F 5/08 |
| WO | WO 2004057741 A1 * | 7/2004 | .......... H02K 55/04 |

* cited by examiner

APPARATUS AND METHODS FOR ANCHORING A MODULAR WINDING TO A ROTOR IN AN ELECTRICAL MACHINE

BACKGROUND OF THE INVENTION

The present invention relates to electrical machines having a rotor and field windings and particularly relates to a locking strip system and methods for anchoring the windings to the rotor.

Conventional electrical machines have rotors that support field windings. These rotors typically have rotor cores with axial slots that receive each turn of the field windings. Wedges are typically used to close the rotor slots to restrain the windings against the centrifugal forces that arise as the rotor spins. There are certain disadvantages to this type of electrical machine construction, e.g., assembly of the windings in the rotor is inefficient. Another type of electrical machine has been proposed and constructed which eliminates many of the disadvantages of those prior conventional electrical machines.

In such newer constructions, preformed modular field windings are installed about the rotor. The rotor has poles with defined pole faces and parallel sides adjacent to the pole faces and a winding module fits over the parallel sides of the poles. The modular field windings include winding support braces axially spaced from one another for holding the winding turns. The winding braces are laterally spaced along the long side of the windings and each brace includes a plurality of windings. The braces collectively hold a nested assembly of windings and the braces and windings are secured to the rotor by a locking mechanism. It will be appreciated that the rotor may support at least a pair of modular windings along opposite poles. Also, the winding braces are fitted to each modular winding prior to its assembly with the rotor. There has, however, developed a need for apparatus and methods for maintaining the modular winding aligned with the rotor.

BRIEF DESCRIPTION OF THE INVENTION

In accordance with an aspect of the present invention, a locking strip system is utilized to anchor the modular winding to the rotor. To accomplish this, the parallel sides of the rotor are provided with axial slots. A pair of elongated, identical locking strips are superposed one over the other and disposed in the slots. Each strip includes pairs of recesses at longitudinally spaced locations along the strip with each pair comprising first and second recesses of different depths, i.e., deep and shallow recesses, respectively, relative to a common long edge. By disposing the strips in the slots with the deepest recesses aligned with one another, the modular winding may be disposed over the pole face with the winding braces in registration with the parallel sides of the rotor. The winding braces are thus received in the aligned deep first recesses of the locking strips. Upon axial displacement of the locking strips relative to one another in opposite axial directions, the second or shallow portions of each strip adjacent the first recesses are disposed in slots formed in the winding braces. The edges of those shallow slots in the two locking strips prevent axial movement of the modular winding relative to the rotor.

To lock the strips to one another, pins are inserted into aligned holes of the locking strips through grooves formed in wedge wings, completing the rotor assembly. The locking strips in the locked configuration thus restrain the modular winding against peripheral movement, and outward displacement along the parallel face of the rotor shaft, as well as axial movement.

In a preferred embodiment according to the present invention, there is provided a locking strip system for anchoring a modular winding in an electrical machine wherein the winding has axially spaced winding supports and the machine includes a rotor having an axial slot, comprising first and second elongated superposed locking strips each having a plurality of recesses spaced one from the other along a long edge thereof, the recesses being arranged in pairs thereof spaced one from the other along the long edge, a first recess of each pair thereof having a depth from the long edge greater than a depth from the long edge of a second recess of each pair thereof, each first recess being spaced from one another along each the strip a distance corresponding to an axial spacing between axially adjacent winding supports and each second recess being spaced from one another along each strip a distance corresponding to the axial spacing between the axially adjacent winding supports, the pairs of recesses being arranged in repeating patterns along the long edge of each locking strip with the second recess of each pair thereof along the first locking strip lying adjacent one side of the first recess thereof and the second recess of each pair of recesses along the second locking strip lying adjacent an opposite side of the first recess of the second locking strip such that, with the locking strips superposed one over the other in an unlocked configuration, the first recesses of the first and second locking strips are aligned with one another to receive the winding supports and in a locking configuration with the strips displaced longitudinally relative to one another, the second recesses of the first and second locking strips are aligned with one another and portions of the strips engage the winding supports, precluding relative movement of the winding module and rotor in at least one direction.

In a further preferred embodiment according to the present invention, there is provided a multi-pole electrical machine comprising a rotor having pole regions with pole faces, parallel sides adjacent the pole faces and an axial slot along the parallel sides, a prefabricated modular winding having axially spaced winding supports for disposition along the parallel sides of the rotor with each support having a slot, a locking strip system for anchoring the modular winding to the rotor along each parallel side thereof including first and second elongated superposed locking strips each having a plurality of recesses spaced one from the other along a long edge thereof, the recesses being arranged in pairs thereof spaced one from the other along the long edge, the strips being superposed one over the other in the axial rotor slot with the long edges thereof facing outwardly of the parallel side, a first recess of each pair thereof having a depth from the long edge greater than a depth from the long edge of a second recess of each pair thereof, each first recess being spaced from one another along each strip a distance corresponding to the axial spacing between axially adjacent winding supports and each second recess being spaced from one another along each strip a distance corresponding to the axial spacing between the axially adjacent winding supports, the pairs of recesses being arranged in repeating patterns along the long edge of each locking strip with the second recess of each pair thereof along the first locking strip lying adjacent one side of the first recess thereof and the second recess of each pair of recesses along the second locking strip lying adjacent an opposite side of the first recess of the second locking strip such that, in an unlocked configuration, the first recesses of the superposed first and second locking strips are aligned with one another to receive the winding supports and, in a locking configuration with the strips displaced longitudinally relative to one another, the second recesses of the first and second locking strips are aligned with one another and received in the winding support slots.

In a further preferred embodiment according to the present invention, there is provided a method for anchoring a modular winding and a rotor to one another for an electrical machine, comprising the steps of (a) providing first and second elongated locking strips each having a plurality of recesses spaced one from the other along a long edge thereof, the recesses being arranged in pairs thereof spaced one from the other along the long edge, (b) superposing the strips one over the other and in a slot along a side face of the rotor with the recesses opening in a direction away from the side face, (c) aligning first recesses on the strips with one another, (d) disposing the modular winding on the rotor with winding supports in registration with the rotor side face and aligned with the aligned first recesses and (e) displacing the strips in axial directions to align portions of the strips adjacent the first recesses in slots formed in the winding supports to retain the modular winding against peripheral movement and outward displacement along the rotor side face.

DETAILED DESCRIPTION OF THE INVENTION

Figure 1:
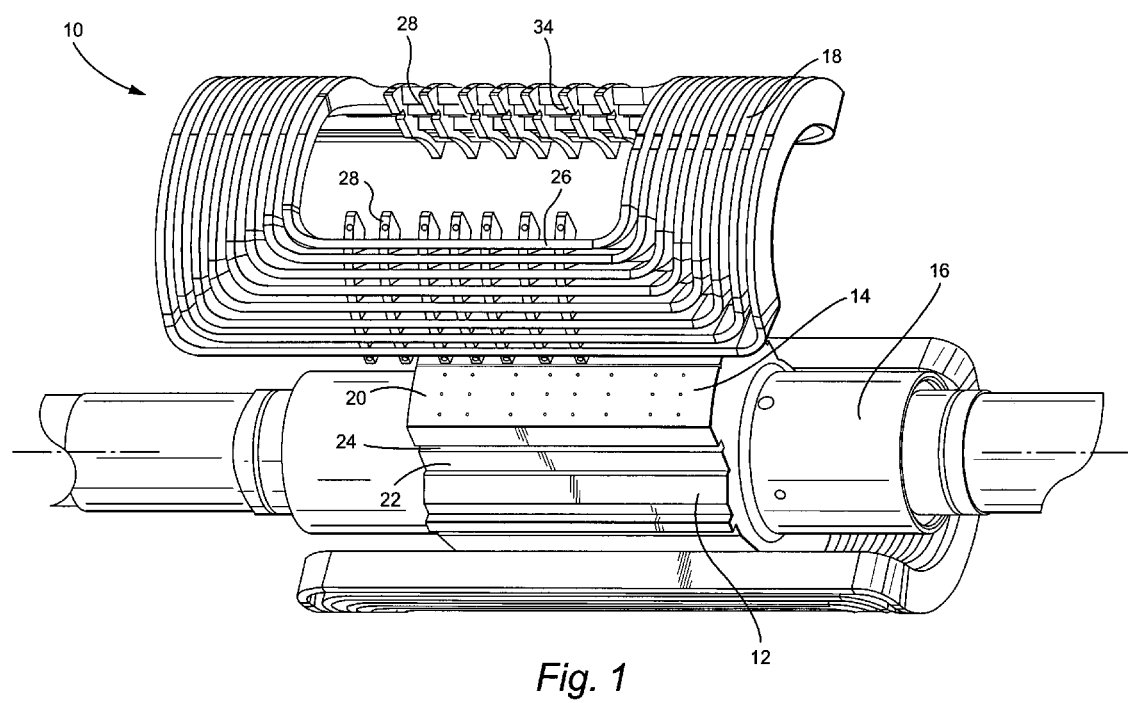
FIG. 1 is an exploded perspective view illustrating modular windings for reception about a pole face of a rotor.
Figure 2:
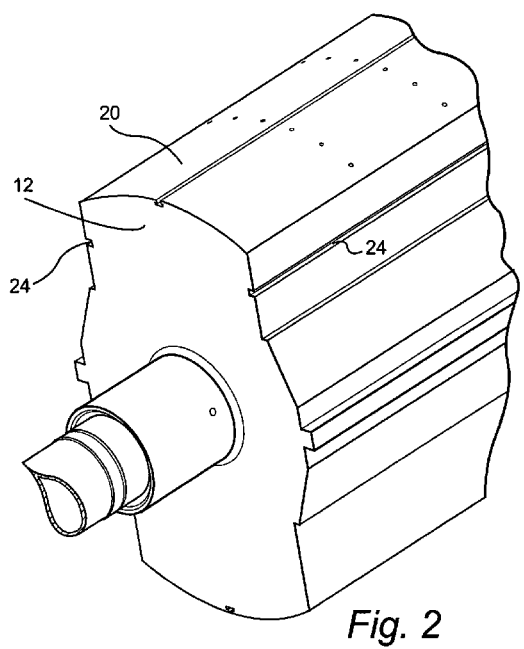
FIG. 2 is a fragmentary perspective view of the rotor illustrating an axial locking slot.
Figure 3:
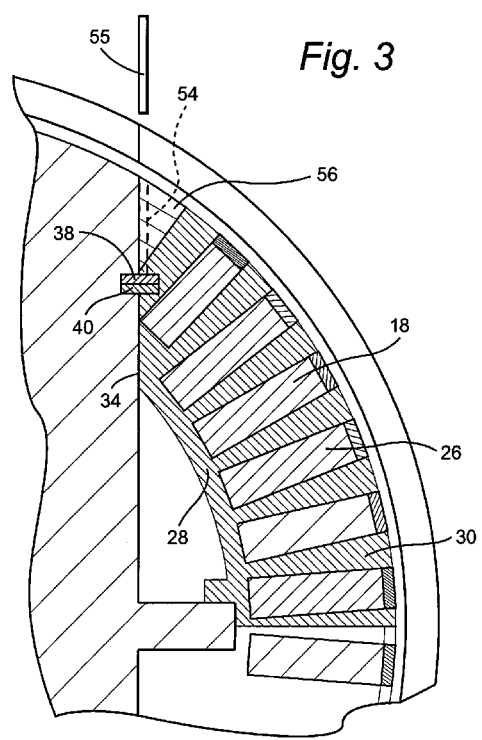
FIG. 3 is a fragmentary cross-sectional end view through the rotor illustrating the locking strips in the locking groove.

As shown in the drawings, particularly to FIG. 1, there is illustrated a portion of an electrical machine, generally designated 10, including a rotor 12 comprised of a multipole magnetic core 14 (a two-pole core being shown) and including spindles 16 at opposite rotor ends. The rotor 12 receives a plurality of modular windings 18, one for each pole. The pole faces 20 of the rotor are arcuate and have generally parallel sides 22. As illustrated, each modular winding 18 is slidable over the parallel sides 22 of the rotor. The modular windings 18 are curved in arcs at their opposite ends to lie in partial concentricity about the spindles 16. In final position on the rotor 12, the axially extending windings between the end arcs essentially have outer arcuate surfaces forming continuations of the arcuate pole faces 20. A portion of the rotor is illustrated in FIG. 2 and includes on each of the generally parallel sides straddling the pole faces 20 an axial locking groove 24 forming part of a system for anchoring the modular windings 18 to the rotor 12. A portion of a modular winding 18 is illustrated in FIG. 3 and includes a plurality of axially extending field windings 26 and winding supports or braces 28. The winding braces 28 include a plurality of circumferentially and axially spaced, generally radially outwardly projecting elements 30 defining spaces circumferentially therebetween for receiving the modular field winding 26. The winding braces 28 have linear extending interior faces 34 which lie in opposition with the parallel sides of the rotor upon final assembly. Additionally, the winding braces 28 also include slots 36 (FIG. 6) along their interior faces 34. The field windings 18 are secured to the rotor by the cooperation of a pair of locking strips 38 and 40 superposed one over the other and extending within the axial groove 24 of the rotor and the slot 36 of the winding module 18.

Figure 4:
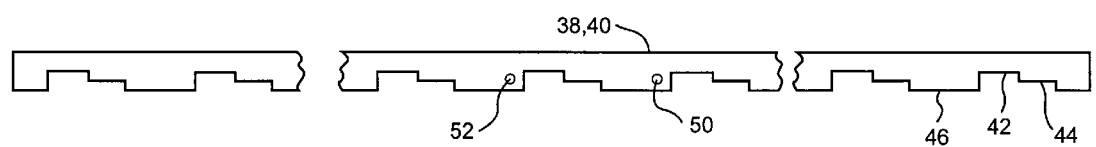
FIG. 4 is a plan view with parts broken out of a locking strip.

As shown in FIG. 4, each of the two locking strips 38 and 40 are identical in configuration and a description of one suffices for a description of the other. In FIG. 4, each locking strip 38, 40 comprises an elongated strip of suitable material extending the length of the poles. Locking strips 38 and 40, as illustrated in FIG. 4, each have pairs of first and second recesses 42 and 44 formed along a long edge 46 of the strips. The pairs of recesses 42 and 44 are spaced one from the other along the long edge. The first recesses 42 of each pair have a depth from the long edge 46 greater or deeper than the depth from the long edge of the second or shallow recesses 44. That is, the first recesses 42 and the second recesses 44 are, respectively, deep and shallow relative to the long edge 46. The first recesses are spaced one from the other along each strip 38 and 40 a distance corresponding to the axial spacing of the winding supports 28. Likewise, the second shallow recesses 44 are spaced from one another along each strip a distance corresponding to the axial spacing of the winding supports 28. The pairs of recesses 42 and 44 lie adjacent one another and are arranged in repeating patterns along the long edge 46 of each strip.

Figure 5A:
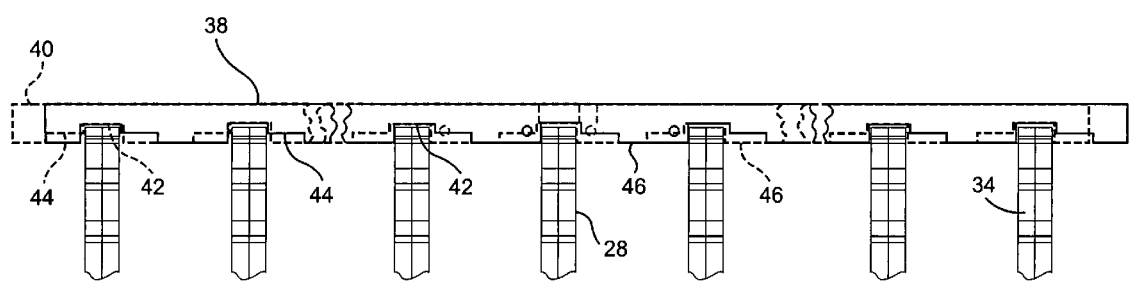
FIG. 5A is a plan view of the locking strips in position both before and after the winding module has been lowered into place.
Figure 5B:
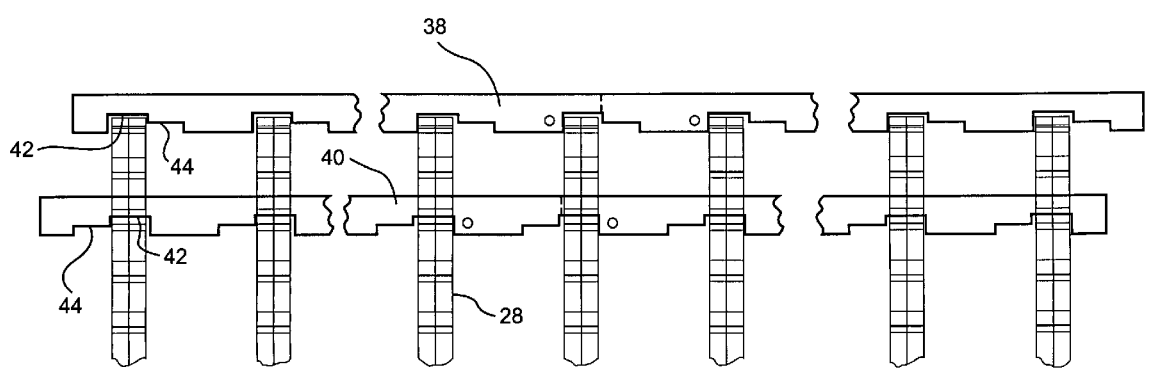
FIG. 5B is a view similar to FIG. 5A showing the two locking strips laterally displaced for illustration purposes only to show the features and alignments of the individual strips.

In use, the strips 38 and 40 are reversed end-to-end, for example, as illustrated in FIGS. 5A and 5B. Consequently, the strips 38 and 40 are offset longitudinally relative to one another with the first deep recesses 42 of strip 38 in registration with the deep recesses 42 of strip 40 as illustrated in FIG. 5A. The second shallow recesses 44 of the strips, however, are longitudinally located to opposite sides of the first recesses 42. That is, when superposed before and after the winding module is lowered into place on the rotor, the second shallow recesses 44 are misaligned one with the other in this unlocked configuration. For example, in FIG. 5A, the shallow slots 44 of strip 38 lie to the right of supports 28 while the shallow slots 44 of strip 40 lie to the left of supports 28. Consequently, when the superposed strips 38 and 40 are disposed in the axial groove 24 with the long edges 46 thereof projecting in a direction outwardly of the sides of the rotor pole, the first deep recesses 42 of each strip are aligned with one another in a chordwise direction, enabling the inner faces 34 of the winding supports to engage in the large recesses 42 upon assembly. As illustrated in FIG. 3, the slots 36 formed along the winding supports 28, upon assembly of the winding module onto the rotor, lie in registration with the axial groove 24 and the strips 38 and 40.

Figure 7:
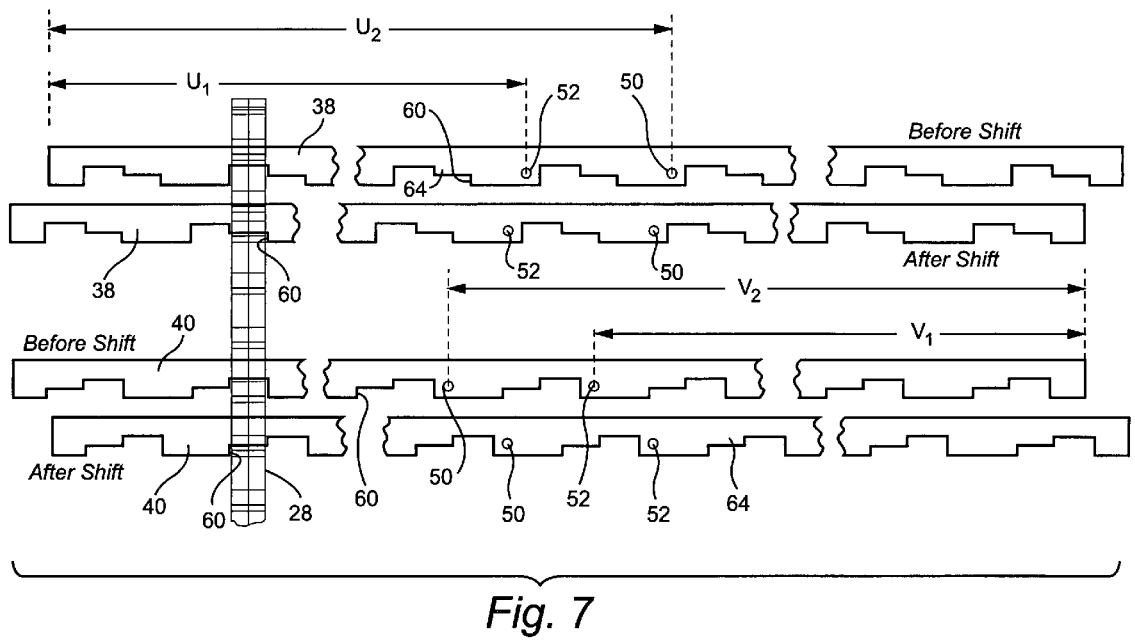
FIG. 7 is a schematic view showing the two locking strips and illustrating the relative location of the strips both before and after axial shifting thereof between rotor/winding assembly and locking configurations.
Figure 8:
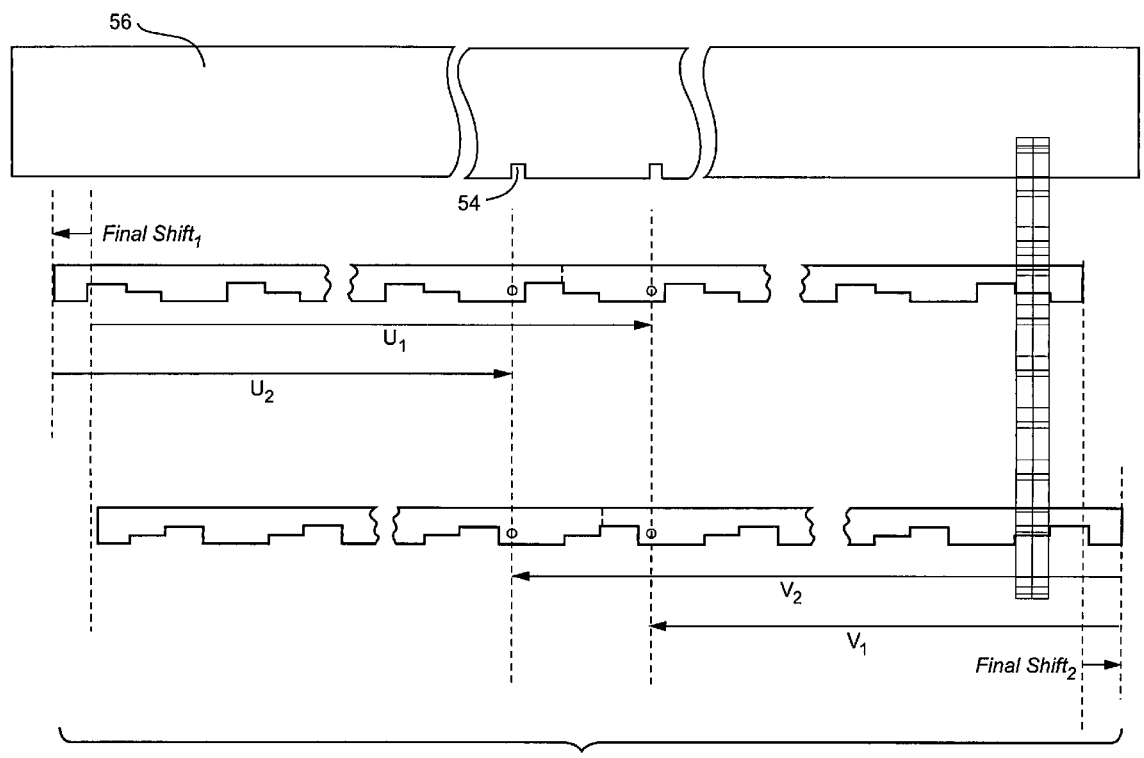
FIG. 8 is a schematic illustration showing the magnetic wing grooves in alignment with the locking holes of the locking strips.

As shown in FIG. 7, each of the strips 38 and 40 includes at least one, and preferably a pair of holes 50 and 52, enabling the locking strips 38 and 40 to be locked to one another after assembly of the winding module onto the rotor. Since the strips 38 and 40 are identical parts, the first hole 50 of the locking strip 38 is spaced from one end of the first locking strip a distance $U_2$ corresponding to the distance $V_2$ that the corresponding hole 50 of the second strip 40 is spaced from the same end of strip 40. The second hole 52 of the first locking strip 38 is spaced from the first end of the first locking strip 38 a distance $U_1$ corresponding to the distance $V_1$ that the corresponding hole 52 of the second strip 40 is spaced from the same end of strip 40. Consequently, it will be appreciated that the holes 50 and 52 of the first locking strip 38 are misaligned with the holes 50 and 52 of the second locking strip 40 in the unlocked configuration before and after the winding module has been placed on the rotor and before the strips are axially shifted in opposite directions relative to one another into the locking configuration. It will be appreciated that upon axial displacement of the locking strips in opposite axial directions, the holes 50, 52 and 52, 50 of the first and second locking strips, respectively, are aligned with one another and also with grooves 54 formed in a magnetic wing 56 disposed between the field winding and the side face of the rotor as illustrated in FIG. 8. Thus, with the sets of holes 50, 52 and 52, 50 aligned with one another at like axial positions, respectively, in the locking configuration, spring pins 55 (FIG. 3) may be inserted in the grooves 54 and into the respective aligned holes 50 and 52 to lock the assembly in place.

Figure 6:
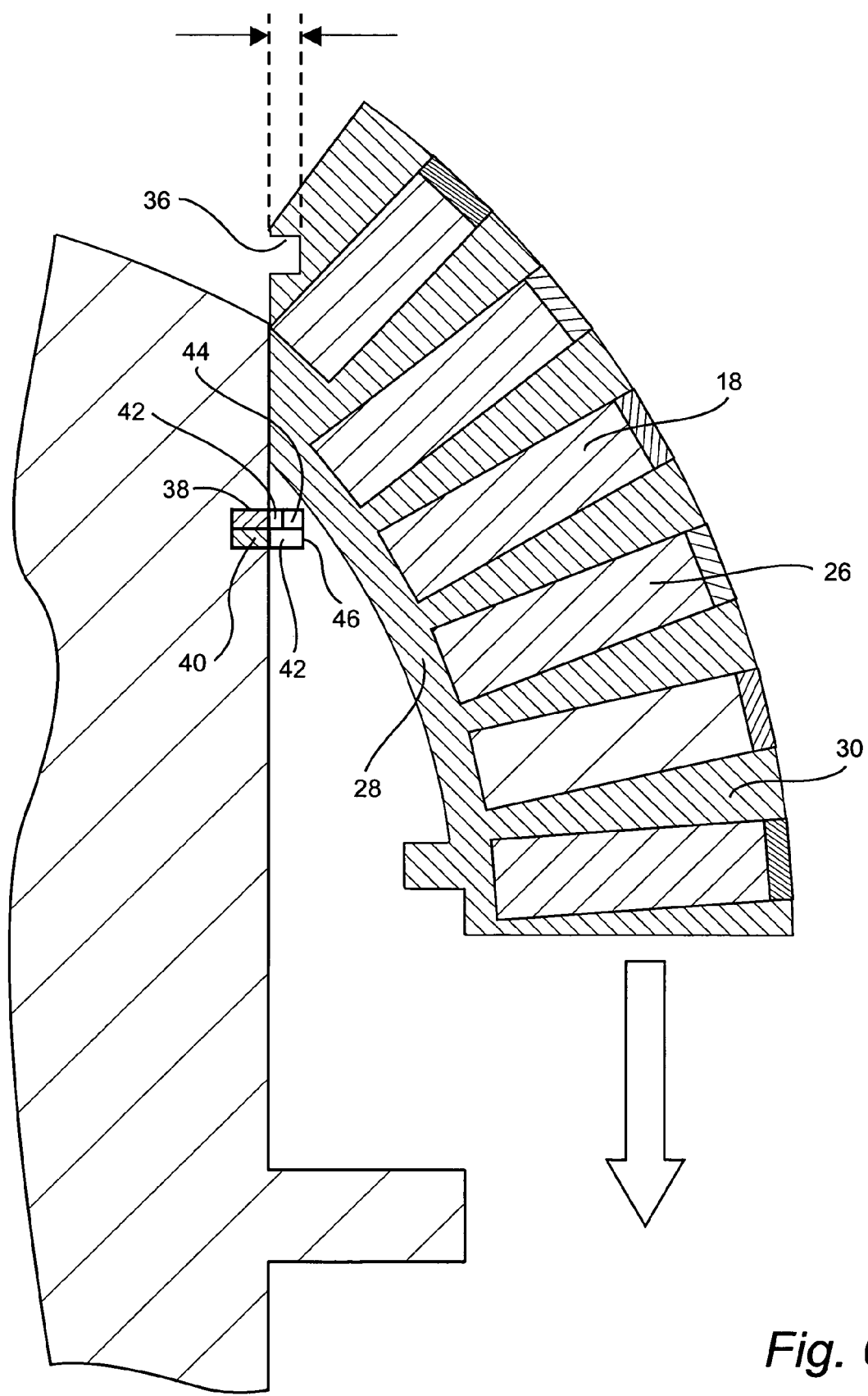
FIG. 6 is a view similar to FIG. 3 illustrating assembly of the modular winding onto the rotor.

To assemble the winding module onto the rotor, the locking strips 38 and 40 are reversed end-to-end, superposed and placed in the groove 24 along the side face of the rotor. The locking strips are located in an unlocked configuration wherein the deep recesses 42 are aligned or in registration one with the other and wherein the second shallow recesses 44 are misaligned one with the other as can be seen from a review of FIG. 5A and a comparison of the before shift illustration of the strips 38 and 40 in FIG. 7. With the strips in this unlocked configuration, the winding assembly is lowered about the pole face as illustrated in FIG. 6 such that the winding supports 28 are received in the aligned deep recesses 42. As illustrated in FIG. 3, the winding module is disposed over the pole in final position to register the groove 36 with the groove 24. Once the grooves 36 and 24 are aligned, the strips 38 and 40 are both shifted axially in opposite directions. For example, and with reference to FIG. 7, the locking strip 38 is shifted in one axial direction, for example, to the left as in FIG. 7 to its "After Shift" position. The other locking strip 40 is shifted axially to the right, as illustrated in FIG. 7 to its "After Shift" position. As noted previously, upon axial shifting of the locking strips 38 and 40, the holes 50 and 52 of the locking strip 38 are aligned with the holes 52 and 50, respectively, of the locking strip 40 and with the grooves 54 (FIG. 3) of the magnetic wing 56. By placing spring pins 55 in the grooves and through the aligned holes 50 and 52, the locking assembly is maintained in place. As a consequence, edges 60 of the second shallow recesses 44 on strip 38 engage edges of the winding supports 28, preventing the winding braces and, hence, the winding module, from axial movement to the right. The corresponding edges 60 of the other strip 40, when shifted to the right, engage the winding supports 28, preventing axial movement of the winding braces 28 and, hence, the winding module from axial movement to the left in FIG. 7. The edges 60 of the first and second locking strips 38 and 40 thus straddle opposite sides of each winding support 28.

It will be appreciated that the edges 60 of the locking strips prevent axial movement of the modular winding relative to the rotor. Also, the portions 64 bordering the shallow recesses 42 of each strip 38 and 40 engage in the grooves 36 of the winding supports 28, preventing peripheral movement and outward displacement of the modular winding relative to the rotor shaft.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A locking strip system for anchoring a modular winding in an electrical machine wherein the winding has axially spaced winding supports and the machine includes a rotor having an axial slot, comprising:

first and second elongated superposed locking strips each having a plurality of recesses spaced one from the other along a long edge thereof, said recesses being arranged in pairs thereof spaced one from the other along said long edge;

a first recess of each pair thereof having a depth from said long edge greater than a depth from said long edge of a second recess of each pair thereof, each said first recess being spaced from one another along each said strip a distance corresponding to an axial spacing between axially adjacent winding supports and each said second recess being spaced from one another along each said strip a distance corresponding to the axial spacing between the axially adjacent winding supports;

said pairs of recesses being arranged in repeating patterns along said long edge of each locking strip with the second recess of each pair thereof along said first locking strip lying adjacent one side of said first recess thereof and said second recess of each pair of recesses along said second locking strip lying adjacent an opposite side of said first recess of said second locking strip such that, with said locking strips superposed one over the other in an unlocked configuration, said first recesses of said first and second locking strips are aligned with one another to receive the winding supports and in a locking configuration with said strips displaced longitudinally relative to one another, said second recesses of said first and second locking strips are aligned with one another and portions of said strips engage the winding supports, precluding relative movement of the winding module and rotor in at least one direction.

2. A locking strip system according to claim 1 wherein said first and second locking strips constitute identical parts.

3. A locking strip system according to claim 1 including at least one locking hole in each said locking strip misaligned with the hole in the other strip in said superposed unlocked configuration, said holes being aligned with one another in said superposed locking configuration.

4. A locking strip system according to claim 3 including a pin received through said aligned holes to retain said locking strips in said locking configuration.

5. A multi-pole electrical machine comprising:

a rotor having pole regions with pole faces, parallel sides adjacent the pole faces and an axial slot along said parallel sides;

a prefabricated modular winding having axially spaced winding supports for disposition along said parallel sides of said rotor with each support having a slot;

a locking strip system for anchoring the modular winding to the rotor along each parallel side thereof including first and second elongated superposed locking strips each having a plurality of recesses spaced one from the other along a long edge thereof, said recesses being arranged in pairs thereof spaced one from the other along said long edge, said strips being superposed one over the other in said axial rotor slot with the long edges thereof facing outwardly of said parallel side;

a first recess of each pair thereof having a depth from said long edge greater than a depth from said long edge of a second recess of each pair thereof, each said first recess being spaced from one another along each said strip a distance corresponding to the axial spacing between axially adjacent winding supports and each said second recess being spaced from one another along each said strip a distance corresponding to the axial spacing between the axially adjacent winding supports;

said pairs of recesses being arranged in repeating patterns along said long edge of each locking strip with the second recess of each pair thereof along said first locking strip lying adjacent one side of said first recess thereof and said second recess of each pair of recesses along said second locking strip lying adjacent an opposite side of said first recess of said second locking strip such that, in an unlocked configuration, said first recesses of said superposed first and second locking strips are aligned with one another to receive the winding supports and, in a locking configuration with said strips displaced longitudinally relative to one another, said second recesses of said first and second locking strips are aligned with one another and received in the winding support slots.

6. An electrical machine according to claim 5 wherein said first and second locking strips constitute identical parts.

7. An electrical machine according to claim 5 including at least one locking hole in each said locking strip misaligned with the hole in the other strip in said superposed unlocked configuration and aligned with one another in said superposed locking configuration, and a pin received through said aligned holes to retain said locking strips in said locking configuration.

8. An electrical machine according to claim 7 including a wing between said modular winding and said parallel rotor side and at least one groove formed along a surface of said wing for receiving the pin and enabling insertion of the pin through the aligned holes.

9. An electrical machine according to claim 5 including first and second holes in each locking strip spaced axially one from the other, said first hole of said first locking strip being spaced from one end of said first locking strip a distance corresponding to the distance the first hole of said second locking strip is spaced from an opposite end of the second strip when said strips are superposed one over the other, said second hole of said first locking strip being spaced from said first end of said one locking strip a distance corresponding to the distance said second hole of said second locking strip is spaced from said opposite end of said second locking strip when said strips are superposed one over the other, said first and second locking strips constituting identical parts.

10. A method for anchoring a modular winding and a rotor to one another for an electrical machine, comprising the steps of:

(a) providing first and second elongated locking strips each having a plurality of recesses spaced one from the other along a long edge thereof, said recesses being arranged in pairs thereof spaced one from the other along said long edge;

(b) superposing said strips one over the other and in a slot along a side face of said rotor with the recesses opening in a direction away from said side face;

(c) aligning first recesses on said strips with one another;

(d) disposing said modular winding on said rotor with winding supports in registration with said rotor side face and aligned with said aligned first recesses; and (e) displacing said strips in axial directions to align portions of said strips adjacent said first recesses in slots formed in the winding supports to retain the modular winding against peripheral movement and outward displacement along the rotor side face.

11. A method according to claim 10 wherein step (e) includes displacing said strips in axially opposite directions to abut edges of said second recesses of the first and second strips against the winding supports to preclude relative axial movement of said rotor and modular winding.

12. A method according to claim 10 including locking the strips to one another after axial displacement thereof.

13. A method according to claim 12 including providing at least one hole in each strip, aligning said holes with one another upon axial displacement of said strips relative to one another and inserting a pin in said aligned holes to lock the strips against axial displacement relative to one another.

14. A method according to claim 10 wherein step (a) includes providing identical first and second identical locking strips.

* * * * *